H. A. BURKAT.
DEVICE FOR PEELING ORANGES AND SIMILAR FRUIT.
APPLICATION FILED AUG. 17, 1918.
1,285,022.
Patented Nov. 19, 1918.
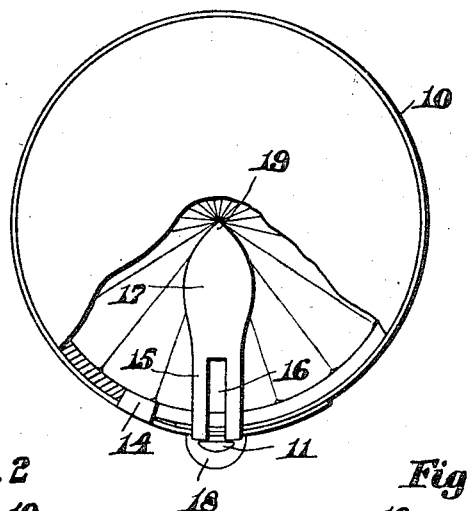
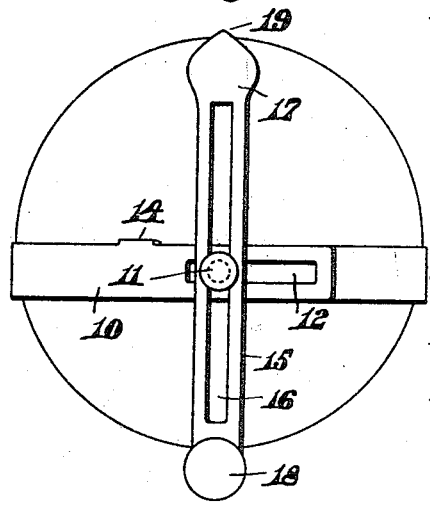
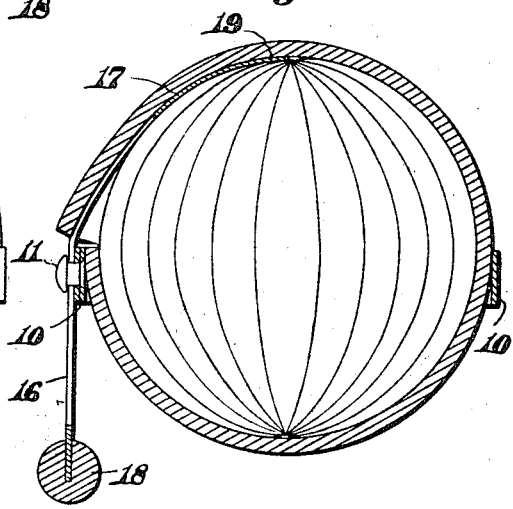
Inventor:
Hyman A. Burkat,
by Walter E. Lombard,
Atty.

UNITED STATES PATENT OFFICE.

HYMAN A. BURKAT, OF BOSTON, MASSACHUSETTS.

DEVICE FOR PEELING ORANGES AND SIMILAR FRUIT.

1,285,022.　　　　Specification of Letters Patent.　　Patented Nov. 19, 1918.

Application filed August 17, 1918. Serial No. 251,041.

*To all whom it may concern:*

Be it known that I, HYMAN A. BURKAT, a citizen of the United States of America, and a resident of Boston, in the county of Suffolk and State of Massachusetts, have invented certain new and useful Improvements in Devices for Peeling Oranges and Similar Fruit, of which the following is a specification.

This device relates to devices for peeling oranges and similar fruit and has for its object the production of a simple device by which the peel may be separated from the body of the orange without the hands of the operator coming into contact with the interior portion of said orange.

The invention consists of an expansive annular member provided on its interior face with a cutter adapted to divide the peel of an orange on a median line, said annular member having also mounted thereon a separating member adapted to be inserted between the peel and the body of the orange whereby in the movement of the annular member about the surface of the orange the peel may be entirely separated from the body portion of said orange.

The invention further consists in certain novel features of construction and arrangement of parts which will be fully understood by reference to the description of the drawings and to the claims to be hereinafter given.

For the purpose of illustrating the invention, one preferred form thereof is illustrated in the drawings, this form having been found to give satisfactory and reliable results, although it is to be understood that the various instrumentalities of which the invention consists can be variously arranged and organized, and that the invention is not limited to the precise arrangement and organization of the instrumentalities as herein shown and described, except as required by the scope of the appended claims.

Of the drawings:

Figure 1 represents a plan of a device embodying the principles of the present invention shown applied to an orange of which a portion of the peel is broken away.

Fig. 2 represents an elevation of the same with the separating member in its outer position, and Fig. 3 represents a vertical section of the same with the separating member inserted beneath the peel.

Similar characters designate like parts throughout the several figures of the drawings.

In the drawings 10 is an annular member formed preferably of spring metal normally in position to encircle a large size orange or similar fruit.

One end of the annular member 10 is provided with a headed pin 11 extending through an elongated slot 12 in the opposite end of said annular member, said headed pin 11 being slidable in said slot 12 so that the diameter of said annular member 10 may be decreased to fit smaller oranges. On the inner face of the member 10 is a short cutter 14 having a knife edge extending lengthwise of said annular member.

When the band or annular member 10 is positioned encircling the orange with its cutter 14 midway between the ends of the orange, the cutter 14 will be pressed through the peel, the depth of the cutter 14 being equal to the thickness of the peel.

If the operator holding the orange in one hand and the annular member 10 in the other hand causes the band 10 to be moved circumferentially about said orange the cutter 14 will divide the peel on a median line.

Between the outer face of the annular member 10 and the head of the pin 11 is a peel separating member 15 provided with a slot 16 in which the shank of the pin 11 is positioned. One end 17 of said peel separating member 15 is curved inwardly and transversely to fit the curvature of the orange while the opposite end thereof is provided with an operating handle 18.

When the peel of the orange has been divided on a median line the end 17 is inserted through the cut so that it will be between the peel and the body of the orange, the separating member 15 being adapted to be moved about its pivot pin 11 to facilitate such insertion.

When once inserted between the peel and body of the orange the peel separating member 15 is moved relatively to the headed pin 11 until its extreme pointed end 19 reaches the end of the core. If the orange and annular member 10 are then moved relatively to each other about the axis of the orange the peel on one side of the median line will be entirely stripped from the body of the orange.

One half of the peel having been separated from the body portion of the orange the position of the separator 15 is reversed and the other half of the peel is then separated in the same manner.

As soon as the two parts of the peel have been thus separated from the body portion of the orange the separator 15 is removed from beneath the peel and pressure on the expansive annular member 10 is removed.

The member 10 will then expand removing the cutter 14 from between the two edges of the divided peel and the band 10 is removed from the orange.

The two sections of peel are still positioned on the body portion of the orange protecting the same from dust and other foreign substances and the interior portion of the orange has not come in contact with the hands of the operator.

The orange thus prepared is served in this form and the guest to whom it is served removes the two sections of peel and uncovers the body portion of the orange for the first time preparatry to eating the same.

The operation and many advantages of a device of this character, it is believed, will be fully understood without further discription.

Having thus described my invention, I claim—

1. An annular member, a cutter thereon, and a separating member mounted on said annular member.

2. An annular member, a cutter thereon, and a separating member pivoted to said annular member.

3. An annular member, a cutter thereon, and a separating member pivoted to said annular member and movable endwise relatively thereto.

4. An expansive annular member, a cutter thereon, and a separating member mounted on said annular member.

5. An annular member, a cutter on the inner face thereof, a pin extending from the outer face thereof, and a separating member movably mounted on said pin.

6. An annular member, a cutter on the inner face thereof, a headed pin on the outer face thereof, and a separating member movably mounted on said pin and provided with a longitudinal slot through which said pin extends.

7. An annular member, a cutter thereon having a cutting edge extending lengthwise of said annular member, and a separating member mounted on said annular member.

8. An annular member provided with a headed pin at one end extending through a slot in the opposite end of said member, a cutter on the inner face of said member, and a separating member pivotally mounted on said annular member.

9. An annular member, a cutter thereon, and a curved separating member pivoted to said annular member.

10. An annular member, a cutter thereon, a curved separating member pivoted to said annular member, and an operating handle for said separating member.

Signed by me at Boston, Massachusetts, this 15th day of August, 1918.

HYMAN A. BURKAT.

Witnesses:
WALTER E. LOMBARD,
NATHAN C. LOMBARD.

Copies of this patent may be obtained for five cents each, by addressing the "Commissioner of Patents, Washington, D. C."